Figure 1:
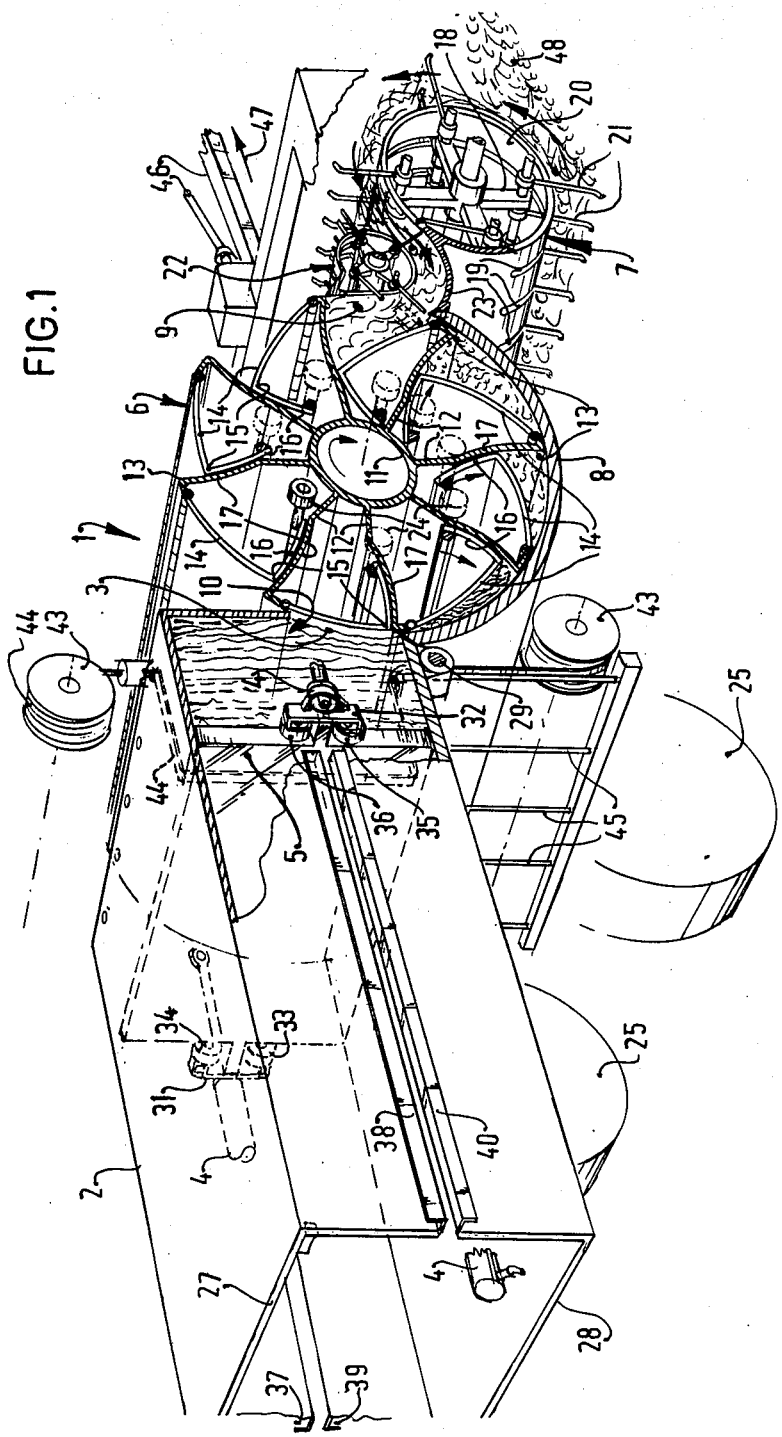

United States Patent [19]

Weelink

[11] Patent Number: 4,464,889

[45] Date of Patent: Aug. 14, 1984

[54] BALING MACHINE EMPLOYING A ROTARY FEEDING AND COMPRESSING DEVICE

[76] Inventor: Johannes M. W. Weelink, No. 10 Brandersdijk, 7136 KV Zieuwent, Netherlands

[21] Appl. No.: 403,364

[22] Filed: Jul. 30, 1982

[30] Foreign Application Priority Data

Aug. 12, 1981 [NL] Netherlands .......................... 8103783

[51] Int. Cl.³ ............................................ A01D 39/00
[52] U.S. Cl. ...................................... 56/341; 100/177; 100/45
[58] Field of Search .......................... 56/341, 344, 345; 100/15, 177, 178, 45

[56] References Cited

U.S. PATENT DOCUMENTS

| 698,566 | 4/1902 | Shirreffs | 100/177 |
|---|---|---|---|
| 1,496,363 | 6/1924 | Bonuofoux | 56/341 |
| 3,889,588 | 6/1975 | Wollersheim | 100/177 |
| 4,104,853 | 8/1978 | Howard et al. | 56/341 |
| 4,240,245 | 12/1980 | Oosterling et al. | 56/341 |

FOREIGN PATENT DOCUMENTS

| 104240 | 8/1977 | Canada. | |
| 167729 | 2/1906 | Fed. Rep. of Germany | 100/177 |
| 849028 | 7/1949 | Fed. Rep. of Germany | 56/341 |

Primary Examiner—Gene Mancene
Assistant Examiner—John G. Weiss
Attorney, Agent, or Firm—Diller, Ramik & Wight

[57] ABSTRACT

Charges of loosely bunched crop material are swept along an arcuate wall section leading to the inlet opening of a baling chamber while their volumes are decreased by compressing them radially outwardly against the arcuate wall section. The feeding and compressing mechanism is in the form of a rotary drum having radial partitions defining the feeding and compressing chambers and hinged plate portions to effect the compressing.

18 Claims, 4 Drawing Figures

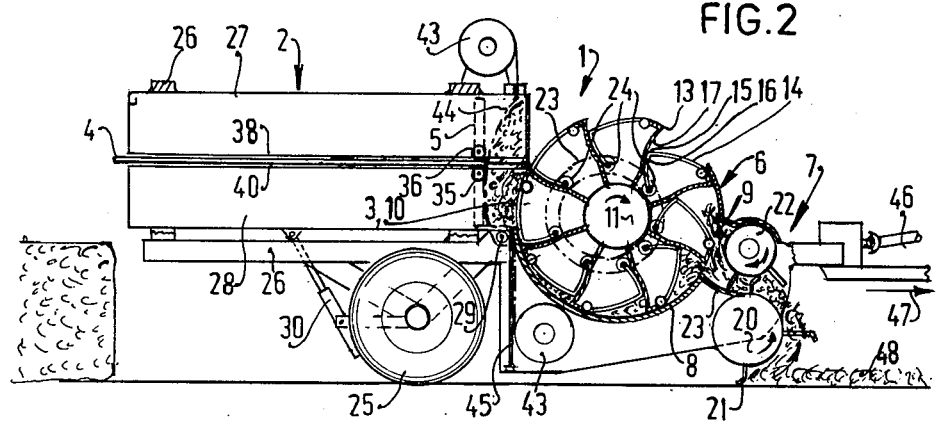
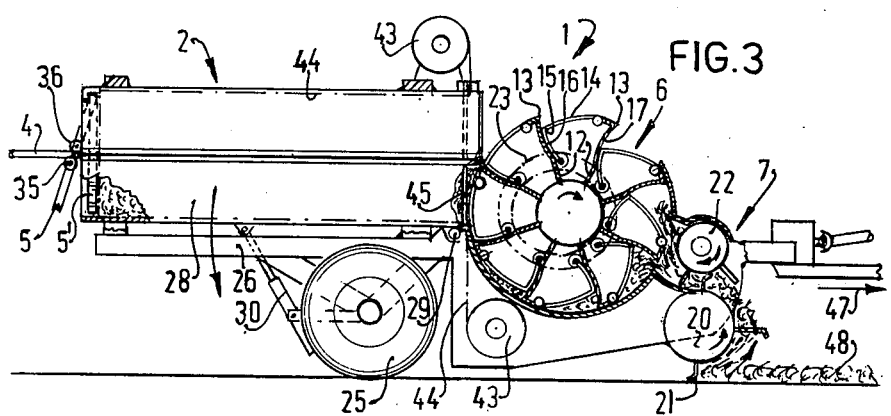
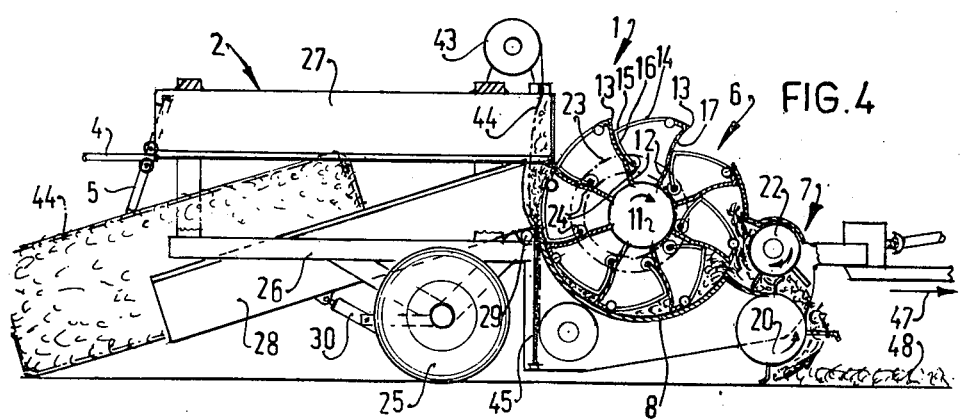

BALING MACHINE EMPLOYING A ROTARY FEEDING AND COMPRESSING DEVICE

The invention relates to baling machines, e.g., a device for compressing into a packet a mass of stalks, stems, blades or another more or less loosely coherent mass, for example, hay.

Such a device is known. The known device has a compression space in which a piston is adapted to reciprocate, while means are provided for feeding the mass to be compressed to the compression space bounded by the cylinder and the piston. Such a device has the disadvantage that the reciprocatory movement brings about heavy, periodic alterations of force, while in addition the mass distribution and hence the equilibrium of the device are periodically disturbed. Moreover, the mass contained in the compression space is periodically compressed and discharged, which involves an unnecessary input and output of air.

The invention has for its object to construct a compression device in a manner such that said force alterations will occur hardly or not at all and, moreover, disturbances of the equilibrium which might give rise to shaking or rocking of the device cannot occur.

A further object of the invention is to provide a device in which the compressing operation takes place substantially continuously so that in addition the production of noise can be limited to a very low level.

In order to achieve the above-mentioned objects the invention proposes a device of the kind set forth in the preamble which comprises a stock container having an inlet opening, an intermediate wall movable inside said stock container away from and towards said opening and subjected to pressure in the direction towards said opening and a pressing member for a pressurized supply of said mass to the inlet opening.

A practical embodiment of the device according to the invention is characterized in that the pressing member comprises a cylindrical drum or part thereof having an inlet opening and a longitudinal opening adjoining the inlet opening of the stock container, in which drum is coaxially arranged a drivable rotor having a plurality of substantially radially extending partitions, in that at or near the free longitudinal edge of each partition there is arranged a displacer adapted to swing about an axis parallel to said edge and having an active pressing face adapted to swing towards the drum wall, in that the radial partitions and the displacer are formed and adapted to co-operate in a manner such that the free longitudinal edge of each partition is in sealing relationship to the partition next to the former in the direction opposite the direction of rotation of the rotor and in that there is provided a guide member which gradually urges each displacer towards the drum wall during its movement away from the inlet opening of the drum towards the longitudinal opening thereof.

Excellent results have been obtained by a pressing device in which the active pressing face of each displacer has substantially the same radius of curvature as the inner surface of the drum. It will be obvious that in this way very high compression forces can be attained.

The guide member may be designed in the form of at least one at least slightly circular guide rail arranged on a drum head wall, the centre of said rail being located between the drum axis and the inlet opening of the stock container, whilst each displacer is provided with a guide element co-operating with the or each guide rail.

The rotor may be advantageously constructed so that it has a low mass. To this end the or each displacer may be designed in the form of a partition, the free peripheral edge of which is provided with a plate forming a seal with the radial partition following next against the direction of rotation of the rotor.

An easy mode of emptying the filled stock container is obtained when the stock container comprises a hood and a trough pivotable with respect to the former between an upper, closed position and an opened position whilst locking means are provided for moving and/or holding the trough in the closed state. When the desired degree of filling is attained, the locking means are unlocked so that the compressed mass slides down the now sloping bottom of the trough.

The locking may comprise at least one spring.

A fully automatic operation can be carried out by means of a device which is characterized in that the intermediate wall is provided with at least one coupling hook cooperating with at least one guide at the hood and a corresponding guide at the trough and, as the case may be, provided with rollers for blocking the downward movement of the trough prior to passing by a position of the intermediate wall corresponding to the end of the or each guide.

The invention will now be described with reference to a drawing of an arbitrarily chosen embodiment. The drawing shows in FIG. 1 a fragmentary and partly schematic, perspective view of a device embodying the invention and FIGS. 2, 3 and 4 relatively corresponding side elevations of the device shown in FIG. 1 in three consecutive working positions.

The device 1 illustrated in the drawing comprises a stock container, or baling chamber 2 having an inlet opening 3, an intermediate wall 5 movable inside said stock container 2 away from and towards the opening 3 and subjected to the pressure of the air spring 4 towards said opening 3 and a pressing member 6 for supplying under pressure to the inlet opening 3 a mass 48 lifted from the ground by pick-up means 7 and formed by stalks, stems, blades, hay or the like.

The pressing member 6 comprises a drum part or arcuate wall section 8 having an inlet opening 9 and a longitudinal opening 10 adjoining the inlet opening 3 of the stock container 2, in which drum part 8 is coaxially arranged a feeding and compressing means in the form of a drivable rotor 11 having a plurality of substantially radially extending partitions 12 which define feeding and compressing chambers therebetween. Near the free longitudinal edge 13 of each partition 12 is arranged a partition or plate-like member 14 adapted to swing about an axis parallel to said edge 13 and having the same radius of curvature as the drum part 8, while the free peripheral edge 15 of each partition 14 is provided with an inwardly extending plate 16, the axis of curvature of which coincides with the pivotal axis of the partition 14. In order to ensure a satisfactory seal the radial partitions 12 each have a cylindrical part 17, the axis of curvature of which also coincides with the pivotal axis of the partitions 14.

The pick-up means 7 comprise a rotatably drivable pick-up rake 18 having fingers 21 that can protrude through elongate holes 19 in a drum 20 and that convey stalks, stems or the like to be compressed, picked up from the ground in the direction indicated by the arrows towards a rotatably drivable feeding member 22, which has basically the same structure as the rotatable pick-up rake 18. Over and across a curved plate 23, charges of the material emanating from the pick-up rake are supplied by the feeding member 22 via the inlet opening 9 to the feeding and compressing chambers of the pressing member 6.

On the head walls (not shown) of the drum part 8 is arranged a slightly circular guide rail 23, the centre of which is located between the drum axis and the inlet opening 3 of the stock container 2, whereas at the ends of the plates 16 directed towards the drum head walls rollers are provided which co-operate with the guide rail 23. This assembly ensures that during its movement away from the inlet opening 9 up to the longitudinal opening 10 each partition 14 is gradually urged with its active pressing face directed towards the drum part 8 towards the drum wall. It will be clearly apparent from these figures that during the said movement the compression chamber bounded by the partitions 14, the cylindrical parts 17 of the radial partitions 12 and the drum part 8 becomes gradually smaller as a result of which the introduced material is compressed. Thus each charge of material is compressed as it is swept along the wall 8 toward the inlet opening 3 so that an already compressed mass is fed to the stock container 2.

The stock container 2 comprises a hood 27 fastened to a frame 26 supported by wheels 25 and a trough 28 adapted to pivot with respect to said hood and pivotally supported at the front by a pivotal shaft 29, whilst the bottom is supported by an air spring 30 coupled with the frame 26.

To the intermediate wall 5 are fastened on both sides coupling hooks 31, 32 with rollers 33, 34 and 35, 36 respectively co-operating with guide rails 37, 38 and 39, 40 respectively arranged on the hood 27 and the trough 28 respectively. Pneumatic springs, of which only the spring referenced 4 is shown in FIG. 1, are connected with the coupling hooks 31, 32 for moving the intermediate wall 5 towards the pressing member.

In the state illustrated in FIGS. 1 and 2 the stock container 2 is filled only for a small part with a compressed mass. Mainly the force produced by the pneumatic spring 30 holds the stock container in the closed position, which means that the trough 28 is held lifted against the hood 27. By the operations of the pick-up means 7, the feeding member 22 and the pressing member 6 the degree of filling of the stock container is gradually raised so that at a given instant the weight of the compressed mass becomes so high that the pneumatic spring 30 can no longer supply sufficient force for holding the stock container 2 in the closed position. An undesirable downward tilting of the trough 28 in the direction indicated in FIG. 3 by the arrow 41 is avoided by the effect of the coupling hooks 31, 32 with the rollers 33, 34, 35, 36. As soon as the intermediate wall 5 has passed beyond the position indicated in FIG. 3 the guide rails 37, 39 and 38, 40 are no longer coupled by the coupling hooks 31, 32 so that under the action of the weight of the compressed mass in the stock container 2 the trough 28 tilts down in the manner illustrated in FIG. 4 to allow the compressed mass 42 to slide down to the ground.

In order to form laced-up packets the device 1 is in this embodiment provided with means for entwining the compressed mass. Said means comprise a plurality of stock reels 43 for entwining tape 44 and entwining needles 45 co-operating with said reels and being movable in upward and downward directions. This mechanism is known per se and will, therefore, not be discussed in detail. It is designed to tie up the two tape ends and to subsequently form a new loop around a bale to be formed.

The device 1 is provided at the front with hitching means for being drawn in the direction of the arrow 47 by an agricultural tractor.

The invention is not limited to the embodiment described and illustrated. For example, the displacers may be formed by more solid masses. The rotor may furthermore comprise a fly-wheel serving as an energy buffer so that the driving motor (not shown) is very uniformly loaded.

I claim:

1. A device for compressing into a packet a mass of stalks, stems, blades or another more or less loosely coherent mass, for example, hay characterized by a stock container having an inlet opening, an intermediate wall adapted to move inside said stock container away from and towards said opening and subjected to pressure in the direction towards said opening and a pressing member for supplying under pressure said mass to the inlet opening, the pressing member comprising a cylindrical drum or part thereof having an inlet opening and a longitudinal opening adjoining the inlet opening of the stock container, in which drum is coaxially arranged a drivable rotor having a plurality of substantially radially extending partitions, in that at or near the free longitudinal edge of each partition is arranged a displacer adapted to swing about an axis parallel to said edge and having an active pressing face adapted to swing towards the drum wall, in that the radial partitions and the displacers are formed and adapted to co-operate in a manner such that the free longitudinal edge of each partitions is in sealing relationship with the partition next to the former opposite the direction of rotation of the rotor and in that there is provided a guide member which gradually urges each displacer towards the drum wall during its movement away from the inlet opening of the drum up to the longitudinal opening thereof.

2. A device as claimed in claim 1 characterized in that the active pressing face of each displacer has substantially the same radius of curvature as the inner jacket face of the drum.

3. A device as claimed in claim 1 or 2 characterized in that the guide member is formed by at least one at least slightly circular guide rail arranged on a head wall of the drum, the center of which is located between the drum axis and the inlet opening of the stock container, while each displacer is provided with a guide element co-operating with the guide rail.

4. A device as claimed in claim 3 characterized in that the free peripheral edge of each displacer is provided with a plate in sealing relationship with said partition next to the former opposite the direction of rotation of the rotor.

5. A device as claimed in claim 3 characterized in that the stock container comprises a hood and a trough adapted to pivot with respect to said hood between a closed top position and an opened position and is provided with locking means for moving the trough into holding it in the closed position.

6. A device as claimed in claim 5 characterized in that the intermediate wall is provided with at least one coupling hook provided with rollers, at least one guide at the hood and a corresponding guide at the trough constituting a guide rail, said rollers respectively engaging said guides for blocking the downward movement of the trough prior to passing beyond the position of the intermediate wall corresponding to the end of the guide rail.

7. A device as claimed in claim 1 or 2 characterized in that the free peripheral edge of each displacer is provided with a plate in sealing relationship with said partition next to the former opposite the direction of rotation of the rotor.

8. A device as claimed in claim 7 characterized in that the stock container comprises a hood and a trough adapted to pivot with respect to said hood between a closed top position and an opened position and is provided with locking means for moving the trough into and holding it in the closed position.

9. A device as claimed in claim 8 characterized in that the intermediate wall is provided with at least one coupling hook provided with rollers, at least one guide at the hood and a corresponding guide at the trough constituting a guide rail, said rollers respectively engaging said guides for blocking the downward movement of the trough prior to passing beyond the position of the intermediate wall corresponding to the end of the guide rail.

10. A device as claimed in claim 1 or 2 characterized in that the stock container comprises a hood and a trough adapted to pivot with respect to said hood between a closed top position and an opened position and is provided with locking means for moving the trough into and holding it in the closed position.

11. A device as claimed in claim 10 characterized in that the intermediate wall is provided with at least one coupling hook provided with rollers, at least one guide at the hood and a corresponding guide at the trough constituting a guide rail, said rollers respectively engaging said guides for blocking the downward movement of the trough prior to passing beyond the position of the intermediate wall corresponding to the end of the guide rail.

12. A device as claimed in claim 10 characterized in that the locking means comprise at least one spring.

13. A device as claimed in claim 12 characterized in that the intermediate wall is provided with at least one coupling hook provided with rollers, at least one guide at the hood and a corresponding guide at the trough constituting a guide rail, said rollers respectively engaging said guides for blocking the downward movement of the trough prior to passing beyond the position of the intermediate wall corresponding to the end of the guide rail.

14. In a baling machine, a baling chamber having an inlet opening, an arcuate wall section extending from said baling chamber at said inlet opening, an intermediate wall movable within said baling chamber toward and away from said inlet opening, pressure means normally urging said intermediate wall toward said inlet opening, and rotatable feeding and compressing means cooperable with said arcuate wall section for receiving successive charges of cut crop and sweeping them along said arcuate wall section toward said inlet opening while decreasing the volume thereof by compressing them radially outwardly against said arcuate wall section before reaching said inlet opening, said rotatable feeding and compressing means comprising a rotor having a plurality of generally radially extending partitions presenting free edges which sweep over said arcuate wall section, each adjacent pair of partitions defining a feeding and compressing chamber which receives a charge of cut crop and there being displacer means within each such feeding and compressing chamber for compressing the charge of cut crop against said arcuate wall section as it is swept toward said inlet opening, each displacer comprising a plate-like member pivotally attached to a free edge of one of said partitions and extending therefrom into closely spaced relation to the other partition defining the feeding and compressing chamber with which it is associated.

15. In a baling machine as defined in claim 14 wherein each plate-like member is in trailing relation to the partition to which it is attached.

16. In a baling machine as defined in claim 14 including means for pivoting said plate-like members toward said arcuate wall section as said plate-like members approach said inlet opening and for pivoting said plate-like members in the opposite direction after said plate-like members have passed said inlet opening.

17. In a baling machine as defined in claim 14 including means for pivoting said plate-like members toward said arcuate wall section as said plate-like members approach said inlet opening and for pivoting said plate-like members in the opposite direction after said plate-like members have passed said inlet opening.

18. In a baling machine, an elongate, horizontal baling chamber having a vertically extending inlet opening at one end, an arcuate wall section extending downwardly from said baling chamber at the bottom of said inlet opening on an arc whose upward extension passes into said inlet opening and then out of said inlet opening at the top thereof, an intermediate wall movable within said baling chamber toward and away from said inlet opening, pressure means normally urging said intermediate wall toward said inlet opening, and rotatable feeding and compressing means cooperable with said arcuate wall section for receiving successive charges of cut crop and sweeping them along said arcuate wall section toward said inlet opening while decreasing the volume thereof by compressing them radially outwardly against said arcuate wall section before reaching said inlet opening, said rotatable feeding and compressing means comprising a rotor having a plurality of generally radially extending partitions presenting free edges which sweep over said arcuate wall section and pass in close proximity to said bottom and said top of the inlet opening, each adjacent pair of partitions defining a feeding and compressing chamber which receives a charge of cut crop and there being displacer means within each such feeding and compressing chamber for compressing the charge of cut crop against said arcuate wall section as it is swept toward said inlet opening.

* * * * *

UNITED STATES PATENT AND TRADEMARK OFFICE
CERTIFICATE OF CORRECTION

PATENT NO.  : 4,464,889
DATED       : August 14, 1984
INVENTOR(S) : Johannes M.W. Weelink It is certified that error appears in the above-identified patent and that said Letters Patent is hereby corrected as shown below:

Claim 16, line 1, change "14" to ---15---.

Signed and Sealed this

Twelfth Day of February 1985

[SEAL]

Attest:

DONALD J. QUIGG

Attesting Officer — Acting Commissioner of Patents and Trademarks